(12) United States Patent
Johnson

(10) Patent No.: US 6,956,896 B2
(45) Date of Patent: Oct. 18, 2005

(54) HIGH ACCURACY RECEIVER FORWARD AND REFLECTED PATH TEST INJECTION CIRCUIT

(75) Inventor: Mitchell K. Johnson, McKinney, TX (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/761,833

(22) Filed: Jan. 21, 2004

(65) Prior Publication Data

US 2004/0152431 A1 Aug. 5, 2004

Related U.S. Application Data

(63) Continuation of application No. 09/564,927, filed on May 4, 2000, now Pat. No. 6,704,352.

(51) Int. Cl.[7] .......................... H04B 17/00; H01Q 9/16
(52) U.S. Cl. ....................................... 375/224; 343/822
(58) Field of Search ................................ 375/224, 345, 375/316; 343/822; 455/83, 80, 81, 82, 117, 272

(56) References Cited

U.S. PATENT DOCUMENTS

| 4,380,822 | A | 4/1983 | Broton |
| 4,491,783 | A | 1/1985 | Sawayama et al. |
| 4,590,477 | A | 5/1986 | Regnier et al. |
| 5,689,267 | A | 11/1997 | Cope et al. |
| 5,701,595 | A | 12/1997 | Green, Jr. |
| 6,195,036 | B1 * | 2/2001 | Zybin .......................... 342/202 |
| 6,603,810 | B1 * | 8/2003 | Bednekoff et al. .......... 375/228 |
| 6,704,349 | B1 * | 3/2004 | Masenten .................... 375/219 |
| 6,704,352 | B1 * | 3/2004 | Johnson ...................... 375/224 |
| 6,741,640 | B1 * | 5/2004 | Johnson ...................... 375/219 |

* cited by examiner

Primary Examiner—Khai Tran

(57) ABSTRACT

There is disclosed an injection circuit for measuring radio frequency (RF) signals in an RF receiver for use in measuring the impedance match of a receive antenna and for use in calibrating receiver gain, wherein an advantageous embodiment of the injection circuit comprises: 1) a circulator coupled to the receive antenna; 2) a directional coupler coupled to the circulator; 3) an injection source coupled to the circulator and to the directional coupler, wherein the injection source is capable of injecting a test RF signal into either the circulator or the directional coupler; and 4) a terminating switch for selectively enabling or disabling the transfer of a test RF signal from the injection source to either the circulator or the directional coupler. The circulator has a reverse isolation of at least 20 dB that significantly increases the accuracy of the measurements of the RF signals compared with the accuracy that may be achieved by prior art methods. The present invention obtains the received signal strength indicator (RSSI) measurements at any instantaneous temperature and operating channel and determines voltage standing wave ratio (VSWR) measurements.

26 Claims, 4 Drawing Sheets

HIGH ACCURACY RECEIVER FORWARD AND REFLECTED PATH TEST INJECTION CIRCUIT

CROSS-REFERENCE TO RELATED APPLICATIONS

This application is a continuation of prior U.S. patent application Ser. No. 09/564,927 filed on May 4, 2000 now U.S. Pat. No. 6,704,352.

The present invention is related to that disclosed in U.S. patent application Ser. No. 09/475,604, filed Dec. 30, 1999, entitled "COMBINED SYSTEM FOR CALIBRATING RECEIVER GAIN AND MEASURING ANTENNA IMPEDANCE MATCH AND METHOD OF OPERATION." Application Ser. No. 09/475,604 is commonly assigned to the assignee of the present invention. The disclosure of the related patent application is hereby incorporated by reference in the present application as if fully set forth herein.

TECHNICAL FIELD OF THE INVENTION

The present invention is directed, in general, to wireless communications systems and, more specifically, to radio frequency (RF) test injection circuits for measuring the antenna impedance match of a receive antenna and measuring receiver gain in a base station in a wireless network.

BACKGROUND OF THE INVENTION

In order to increase the number of subscribers that can be serviced in a single wireless network, frequency reuse is maximized by making individual cell sites smaller and using a greater number of cell sites to cover the same geographical area. Accordingly, the greater number of base transceiver stations increases infrastructure costs. To offset this increased cost, wireless service providers continually implement any improvements that may reduce equipment costs, maintenance and repair costs, and operating costs, or that may increase service quality and reliability, and the number of subscribers that the cellular system can service.

In many receivers characterization of forward path gain and calibration of the received signal strength indicator (RSSI) signal are presently accomplished with temperature compensation circuitry. The temperature compensation circuitry adapts to variations in gain, attenuation, and detector slopes over a range of temperatures and frequencies. Because the characteristics of devices and components used in the temperature compensation circuitry change with variations in temperature and frequency, the receivers must be calibrated and characterized at the time of manufacture. However, the characteristics of the devices and components vary within different manufacturing lots. This means that the operating characteristics of the receivers must be continuously monitored during the manufacturing process to detect changes that occur as the manufacturing process progresses.

Therefore, the receiver circuitry must be characterized by analyzing numerous individual receiver units during the manufacturing process in order to develop an accurate profile for the temperature compensation circuitry. After the receiver circuitry has been characterized, the characterization information must be stored in the memory of each of the individual receiver units. Because the manufacturing process produces component changes over a period of time, the receiver characterization process must be re-performed and the information in the memory of each of the individual receiver units must be updated.

There is therefore a need in the art for a receiver design that does not require continual re-characterization of forward path gain and continual recalibration of Received Signal Strength Indicator (RSSI) during the manufacturing process.

After a base transceiver station (BTS) has been manufactured, wireless service providers use a variety of test equipment to monitor the performance of the RF receiver and the RF transmitter in the BTS during operation. The test equipment may monitor a variety of signal parameters in the RF transmitter, including adjacent channel power ratio (ACPR), spectral purity (including in-band and out-of-band spurious components), occupied bandwidth, RHO, frequency error, and code domain power. The test equipment may also perform a variety of test functions in the RF receiver, including testing and measuring the receive antenna return loss and calibrating the receiver. Preferably, the signal parameters are remotely monitored from a central location, so that a wireless service provider can avoid the expense of sending maintenance crews into the field to test each BTS individually. Additionally, a remote monitoring system can detect the failure of an RF transmitter or an RF receiver nearly instantaneously.

Unfortunately, adding some types of test equipment (e.g., spectrum analyzers) to a BTS significantly increases the cost of the BTS. In some cases, the cost of the test equipment may be greater than the cost of the BTS itself. As a result, wireless service providers may not install any test equipment in the ETS. Alternatively, wireless service providers may install only a limited amount of test equipment to test only some of the functions of the BTS. The remaining functions must be monitored by maintenance crews using portable test equipment.

There is therefore a need in the art for inexpensive test equipment that may be implemented as part of the base station. In particular, there is a need for integrated test equipment that can reuse some of the existing circuitry in a base transceiver station. More particularly, there is a need for integrated test equipment that can be used to measure the impedance match of a receive antenna and that can be used to calibrate the receiver gain.

Prior art RF test injection circuits have been used to measure RF signals in an RF receiver in a base station in a wireless network for the purpose of measuring the impedance match of a receive antenna and to calibrate the receiver gain. A prior art injection circuit usually comprises a directional coupler that has an input coupled to a duplexer that is coupled to an antenna array. The output of the directional coupler is coupled to a signal amplifier. Also coupled to the directional coupler is an injection source that is capable of injecting a test RF signal into the directional coupler.

When a prior art injection circuit of this type is used to measure the impedance match of a receive antenna, the injection source injects a test RF signal into the directional coupler in the direction of the signal amplifier. Level detector circuitry that is coupled to the signal amplifier measures the RSSI level of the test RF signal to obtain a first RSSI measurement of the test RF signal.

Then the injection source injects a test RF signal into the directional coupler in the direction of the duplexer that is coupled to the antenna array. The test RF signal passes through the duplexer and hits the antenna array. RF signal energy that is not absorbed by the antenna array is reflected back through the duplexer and through the directional coupler to the signal amplifier and the level detector circuitry. The level detector circuitry coupled to the signal amplifier measures the RSSI level of the test RF signal to obtain a second RSSI measurement of the reflected test RF signal. The level detector circuitry compares the two RSSI measurements to obtain a voltage standing wave ratio (VSWR) that measures the impedance match of the antenna array.

One of the primary deficiencies of this prior art approach is the difficulty of controlling the directivity of the directional coupler. This is because directional couplers are, capable of providing only approximately 10 dB to 15 dB of reverse isolation between its input signal and its output signal. As a result, the directional coupler may transfer a signal that is 10 dB to 15 dB below its output signal back through the duplexer to the antenna array. The relatively low level of reverse isolation that is provided by the directional coupler means that a portion of the signal energy at the output of the directional coupler will be transferred back through the duplexer to the antenna array and reflected back through the duplexer to the directional coupler. The reflected energy adversely affects the RSSI measurements and causes an erroneous determination of the voltage standing wave ratio (VSWR). The same problem occurs when such a prior art injection circuit is used to calibrate the receiver gain.

There is therefore a need in the art for an improved test injection circuit for measuring radio frequency (RF) signals in an RF receiver.

SUMMARY OF THE INVENTION

To address the deficiencies of the prior art described above, it is a primary object of the present invention to provide an improved test injection circuit for measuring radio frequency (RF) signals in an RF receiver. The improved test injection circuit of the present invention may be used to obtain highly accurate RF signal measurements to determine the impedance match of a receive antenna. The improved test injection circuit of the present invention may also be used to obtain highly accurate RF signal measurements to calibrate receiver gain.

An advantageous embodiment of the improved test injection circuit of the present invention comprises: 1) a circulator coupled to an RF receive antenna; 2) a directional coupler coupled to the circulator; 3) an injection source coupled to the circulator and to the directional coupler, wherein the injection source is capable of injecting a test RF signal into either the circulator or the directional coupler; and 4) a terminating switch for selectively enabling or disabling the transfer of a test RF signal from the injection source to either the circulator or the directional coupler.

The circulator has a reverse isolation of at least 20 dB. This is significantly greater than the 10 dB to 15 dB reverse isolation of a prior art directional coupler. The use of a circulator that has at least 20 dB of reverse isolation significantly increases the accuracy of the measurements of the RF signals compared with the accuracy that may be achieved by prior art methods.

The present invention is capable of obtaining received signal-strength indicator (RSSI) measurements at any instantaneous temperature and operating channel. The present invention is capable of using the RSSI measurements to obtain voltage standing wave ratio (VSWR) measurements for any instantaneous temperature and operating channel.

It is an object of the present invention to provide for use in an RF receiver unit a test injection circuit for accurately measuring RF signals within the RF receiver unit.

It is another object of the present invention to provide for use in an RF receiver unit a test injection circuit for accurately measuring RF signals that comprises a circulator coupled to an antenna of the RF receiver unit and an injection source coupled to the circulator that is capable of injecting a test RF signal into the circulator.

It is also an object of the present invention to provide a circulator within the RF receive path of an RF receiver unit that has a reverse isolation of at least 20 dB to increase the accuracy with which RF signals may be measured in the RF receiver unit.

It is another object of the present invention to provide level detector circuitry within an RF receive unit to obtain highly accurate measurements of the received signal strength indicator of an RF signal within the RF receive unit.

It is still another object of the present invention to provide a highly accurate method for calibrating the receiver gain of an RF receive antenna.

It is also another object of the present invention to provide a highly accurate method for measuring the impedance match of an RF receive antenna.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged wireless network.

Figure 1:
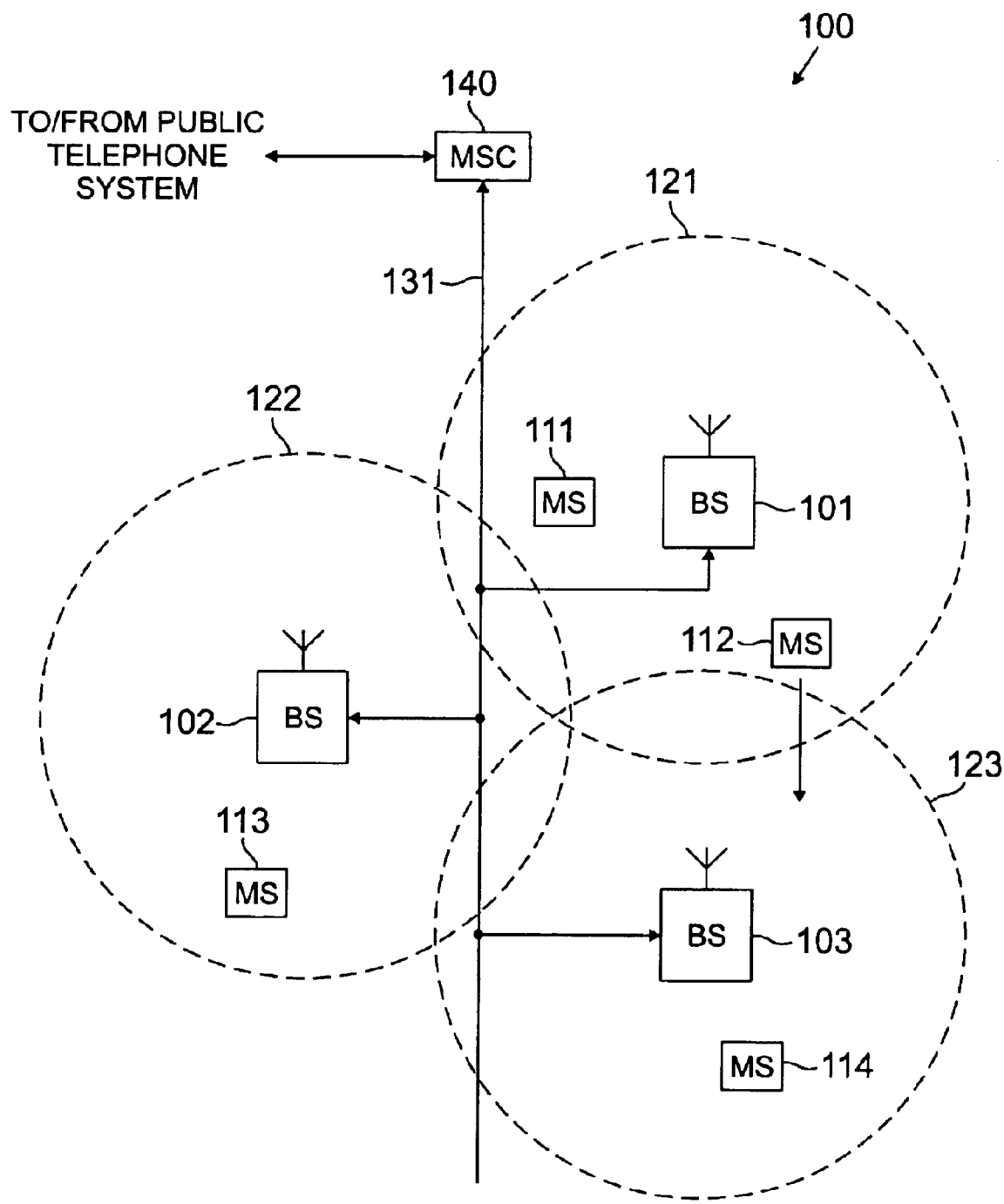
FIG. 1 illustrates an exemplary wireless network according to one embodiment of the present invention.

FIG. 1 illustrates an exemplary wireless network 100 according to one embodiment of the present invention. The wireless telephone network 100 comprises a plurality of cell sites 121–123, each containing one of the base stations, BS 101, BS 102, or BS 103. Base stations 101–103 are operable to communicate with a plurality of mobile stations (MS) 111–114. Mobile stations 111–114 may be any suitable cellular devices, including conventional cellular telephones, PCS handset devices, portable computers, metering devices, and the like.

Dotted lines show the approximate boundaries of the cells sites 121–123 in which base stations 101–103 are located. The cell sites are shown approximately circular for the purposes of illustration and explanation only. It should be clearly understood that the cell sites may have other irregular shapes, depending on the cell configuration selected and natural and man-made obstructions.

In one embodiment of the present invention, BS 101, BS 102, and BS 103 may comprise a base station controller (BSC) and a base transceiver station (BTS). Base station controllers and base transceiver stations are well known to those skilled in the art. A base station controller is a device that manages wireless communications resources, including the base transceiver station, for specified cells within a wireless communications network. A base transceiver station comprises the RF transceiver unit, antennas, and other electrical equipment located in each cell site. This equipment may include air conditioning units, heating units, electrical supplies, telephone line interfaces, and RF transmitters and RF receivers, as well as call processing circuitry. For the purpose of simplicity and clarity in explaining the operation of the present invention, the base transceiver station in each of cells 121, 122, and 123 and the base station controller associated with each base transceiver station are collectively represented by BS 101, BS 102 and BS 103, respectively.

BS 101, BS 102 and BS 103 transfer voice and data signals between each other and the public telephone system (not shown) via communications line 131 and mobile switching center (MSC) 140. Mobile switching center 140 is well known to those skilled in the art. Mobile switching center 140 is a switching device that provides services and coordination between the subscribers in a wireless network and external networks, such as the public telephone system. Communications line 131 may be any suitable connection means, including a T1 line, a T3 line, a fiber optic link, a network backbone connection, and the like. In some embodiments of the present invention, communications line 131 may be several different data links, where each data link couples one of BS 101, BS 102, or BS 103 to MSC 140.

In the exemplary wireless network 100, MS 111 is located in cell site 121 and is in communication with BS 101; MS 113 is located in cell site 122 and is in communication with BS 102; and MS 114 is located in cell site 123 and is in communication with BS 103. The MS 112 is also located in cell site 121, close to the edge of cell site 123. The direction arrow proximate MS 112 indicates the movement of MS 112 towards cell site 123. At some point, as MS 112 moves into cell site 123 and out of cell site 121, a "handoff" will occur.

As is well known, the handoff procedure transfers control of a call from a first cell to a second cell. For example, if MS 112 is in communication with BS 101 and senses that the signal from BS 101 is becoming unacceptably weak, MS 112 may then switch to a BS that has a stronger signal, such as the signal transmitted by BS 103. MS 112 and BS 103 establish a new communication link and a signal is sent to BS 101 and the public telephone network to transfer the on-going voice, data, or control signals through BS 103. The call is thereby seamlessly transferred from BS 101 to BS 103. An "idle" handoff is a handoff between cells of a mobile device that is communicating in the control or paging channel, rather than transmitting voice and/or data signals in the regular traffic channels.

Figure 2:
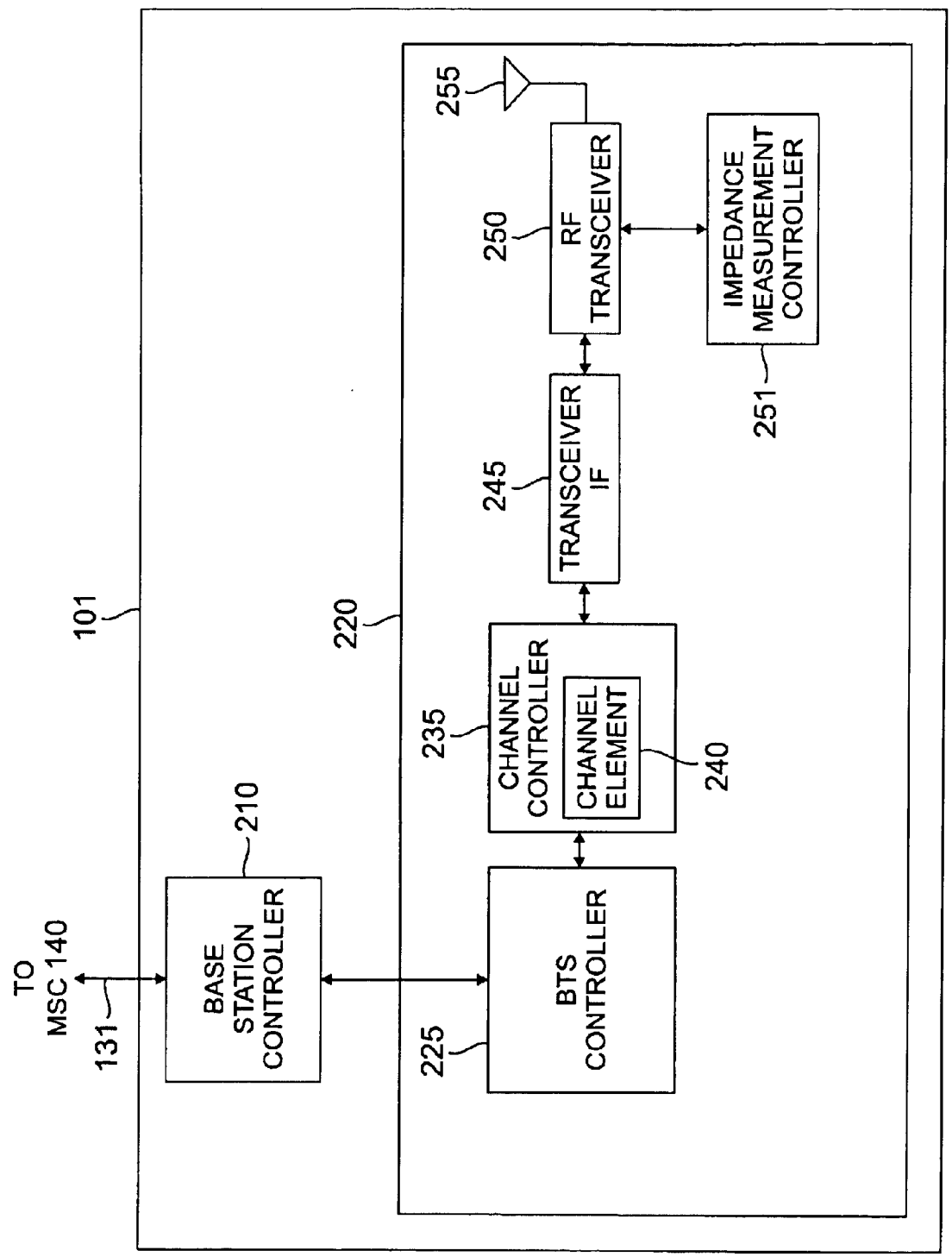
FIG. 2 illustrates in greater detail an exemplary base station in accordance with one embodiment of the present invention.

FIG. 2 illustrates in greater detail exemplary base station 101 in accordance with one embodiment of the present invention. Base station 101 comprises base station controller (BSC) 210 and base transceiver station (BTS) 220. Base station controllers and base transceiver stations were described previously in connection with FIG. 1. BSC 210 manages the resources in cell site 121, including BTS 220. BTS 220 comprises BTS controller 225, channel controller 235, which contains representative channel element 240, transceiver interface (IF) 245, RF transceiver unit 250, antenna array 255 and impedance measurement controller 251.

BTS controller 225 comprises processing circuitry and memory capable of executing an operating program that controls the overall operation of BTS 220 and communicates with BSC 210. Under normal conditions, BTS controller 225 directs the operation of channel controller 235, which contains a number of channel elements, including channel element 240, that perform bi-directional communications in the forward channel and the reverse channel. A "forward" channel refers to outbound signals from the base station to the mobile station and a "reverse" channel refers to inbound signals from the mobile station to the base station. In an advantageous embodiment of the present invention, the channel elements operate according to a code division multiple access (CDMA) protocol with the mobile stations in cell 121. Transceiver IF 245 transfers the bi-directional channel signals between channel controller 235 and RF transceiver unit 250.

Impedance measurement controller 251, in conjunction with circuitry located in RF transceiver unit 250, measures the receiver gain and the impedance match for the receive antenna portion of antenna array 255. Portions of RF transceiver unit 250 and the operation of impedance measurement controller 251 are described below in greater detail in connection with FIGS. 3 and 4.

Antenna array 255 transmits forward channel signals from RF transceiver unit 250 to mobile stations in the coverage area of BS 101. Antenna array 255 also transfers to transceiver unit 250 reverse channel signals received from mobile stations in the coverage area of ES 101. In an advantageous embodiment of the present invention, antenna array 255 is multi-sector antenna, such as a three sector antenna in which each antenna sector is responsible for transmitting and receiving in a one hundred twenty degree (120°) arc of coverage area. Additionally, RF transceiver unit 250 may contain an antenna selection unit to select among different antennas in antenna array 255 during both transmit and receive operations.

Figure 3:
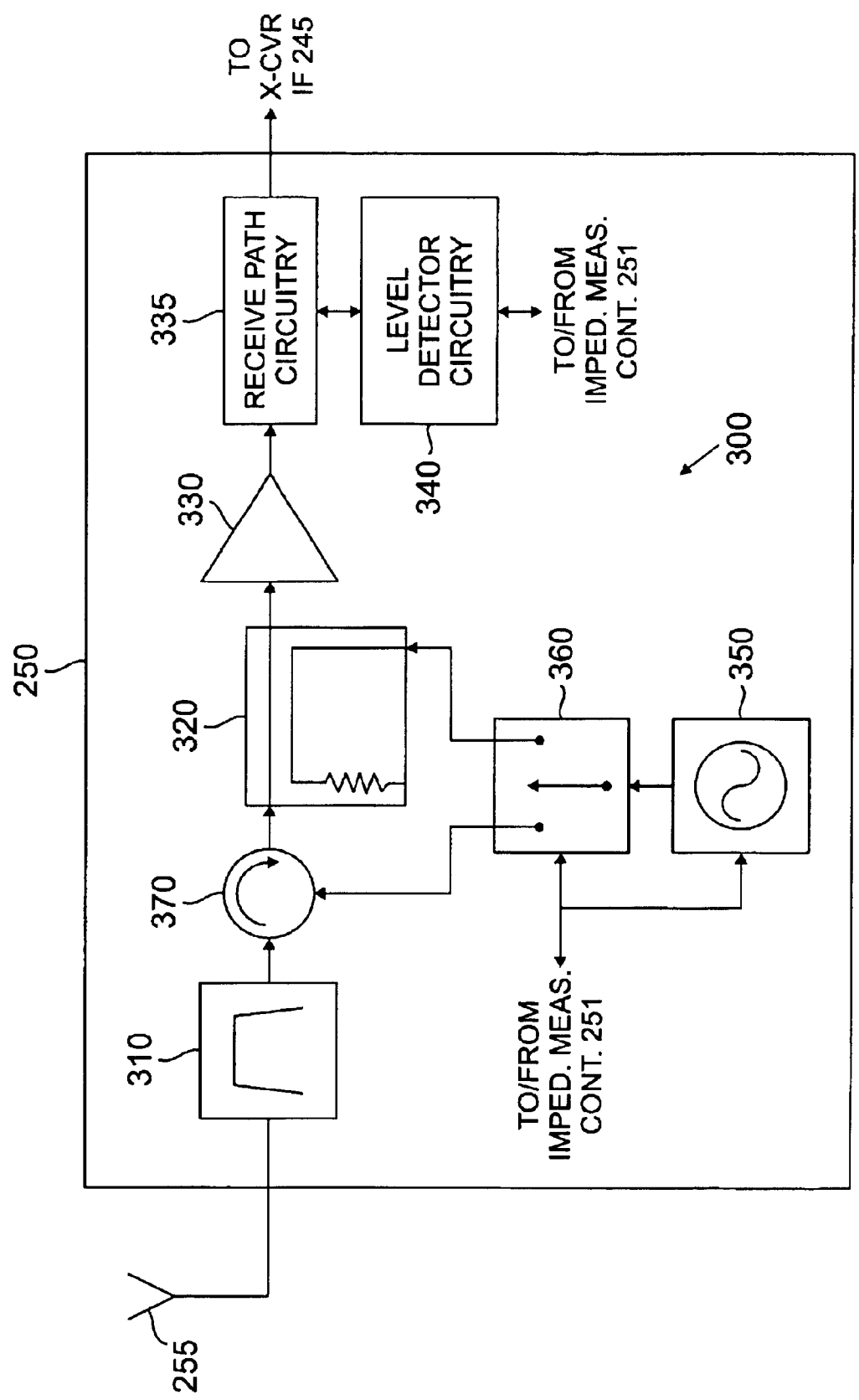
FIG. 3 illustrates a portion of an exemplary RF transceiver unit in accordance with an advantageous embodiment of the present invention comprising an injection circuit that uses a circulator and a directional coupler.

FIG. 3 illustrates a portion of exemplary RF transceiver unit 250 in accordance with an advantageous embodiment of the present invention. As will be fully described, the injection circuit of the present invention uses a circulator as a circuit element. An advantageous embodiment of the present invention comprises both a circulator and a directional coupler. RF transceiver unit 250 comprises a circuit branch 300 (shown in FIG. 3) for receiving an RF signal. Circuit branch 300 comprises antenna array 255, duplexer 310, circulator 370, directional coupler 320, low noise amplifier (LNA) 330, receive path circuitry 335, and level detector circuitry 340. Circuit branch 300 also comprises injection source 350 and single-pole double-throw (SPDT) terminating switch 360. Impedance measurement controller 251 enables and controls the measurement function of level detector circuitry 340.

Duplexer 310 filters the signal path to and from the antenna array 255 as RF transceiver unit 250 transmits (forward channel) signals and receives (reverse channel) signals. Duplexer 310 isolates the receive signals in a receive signal frequency band (e.g., 1850–1910 MHz) from the transmit signals in a transmit signal frequency band (e.g., 1930–1990 MHz). Duplexer 310 permits the sharing of antenna array 255 by the RF receiver portion and the RF transmitter portion of RF transceiver unit 250.

Receive (reverse channel) signals from antenna array 255 pass through duplexer 310 to circulator 370. In this exemplary advantageous embodiment of the present invention, circulator 370 is a device that has three terminals. The three terminals are a first input terminal (coupled to duplexer 310) and a second input terminal (coupled to terminating switch 360) and an output terminal (coupled to directional coupler 320). When circulator 370 receives a signal at one of its terminals, circulator 370 transfers the signal to an adjacent terminal. Some circulators are designed to circulated a signal in a clockwise direction. Some circulators are designed to circulate a signal in a counterclockwise direction. In the exemplary advantageous embodiment of the present invention shown in FIG. 3 circulator 370 circulates a signal in a clockwise direction.

When circulator 370 receives an RF signal from duplexer 310 on the first input terminal of circulator 370, then circulator 370 transfers the signal to directional coupler 320. At the same time, circulator 370 transfers to duplexer 310 any signal that circulator 370 receives on its second input terminal from single-pole double-throw (SPDT) terminating switch 360. As shown in FIG. 3, the second input terminal of circulator 370 is connected to one output of terminating switch 360. As described more fully below, the signal from terminating switch 360 originates from injection source 350 and is used to measure a reflected signal from antenna array 255.

The signals that circulator 370 transfers to directional coupler 320 pass through directional coupler 320. Directional coupler 320 combines the signals from circulator 370 with the signals, if any, from the other input of directional coupler 320 (i.e., the input of directional coupler 320 that is coupled to terminating switch 360 and injection source 350). The resulting signals then pass to low noise amplifier (LNA) 330. Low noise amplifier 330 amplifies the signals from directional coupler 320 and transfers the amplified signals to receive path circuitry 335. The output of receive path circuitry 335 is coupled to transceiver IF 245. Level detector circuitry 340 is coupled to receive path circuitry 335. Impedance measurement controller 251 is coupled to level detector circuitry 340 and is capable of enabling and controlling the measurement function of level detector circuitry 340.

In this advantageous embodiment of the present invention, the injection circuitry comprises injection source 350 that is coupled to circulator 370 and to directional coupler 320 by a single-pole double-throw (SPDT) terminating switch 360. The output of injection source 350 is provided as an input to terminating switch 360. Terminating switch 360 may transfer the injection signal from the injection source 350 either to the second input terminal of circulator 370 or to the coupled-input of directional coupler 320.

Impedance measurement controller 251 is capable of controlling terminating switch 360. Impedance measurement controller 251 selectively enables and disables the output from injection source 350, by controlling the position of terminating switch 360 depending upon the type of RF signal measurement to be performed. When impedance measurement controller 251 causes terminating switch 360 to close toward the right side of terminating switch 360 (as shown in FIG. 3), injection source 350 provides an injection signal to directional coupler 320. When impedance measurement controller 251 causes terminating switch 360 to close toward the left side of terminating switch 360 (as shown in FIG. 3), injection source 350 provides an injection signal to circulator 370. The injection signal is an RF signal with a frequency that is preferably in the central portion of the frequency operating range of the RF receiver portion of RF transceiver unit 250.

As previously mentioned, impedance measurement controller 251 enables and controls the measurement function of level detector circuitry 340. The level detector circuitry 340 provides AGC and RSSI level detection for use by impedance measurement controller 251. In an advantageous embodiment of the present invention, level detector circuitry 340 uses AGC detectors in transreceiver IF 245 for detecting AGC levels, rather than providing a separate AGC detector for measurement purposes. If measurements are not being performed, impedance measurement controller 251 disables the output of injection source 350. When injection source 350 is disabled, no signal is being injected into RF transceiver unit 250 for measurement purposes.

The injection signal from injection source 350 may be used to measure the return loss of antenna array 255, as well as measure parameters associated with the performance of the RF receiver portion of RF transceiver unit 250. When injection source 350 is connected to directional coupler 320 through terminating switch 360, directional coupler 320 provides an output for level detector circuitry 340 that is a combination of the injection signal from injection source 350 and the RF receive signal, if any. The output signal from directional coupler 320 is used for measuring the RSSI level of signals in the RF receive path for use in determining the return loss for antenna array 255 or for calibrating the RF receiver of RF transceiver unit 250.

In this advantageous embodiment of the invention, the return loss for antenna array 255 may be measured. In the first step of the measurement process, impedance measurement controller 251 causes terminating switch 360 to close toward the right side of terminating switch 360 (as shown in FIG. 3) to cause a first injection signal to be transferred to directional coupler 320. First injection signal is coupled in the direction of low noise amplifier (LNA) 330, receive path circuitry 335, and level detector circuitry 340. For convenience, this direction will be referred to as the "receiver forward path." The first injection signal is treated as a normal input signal which goes through receive path circuitry 335 to automatic gain control (AGC) circuit (not shown). The AGC circuit controls the gain of the first injection signal in accordance with well known AGC principles. Level detector circuitry 340 then determines the RSSI level of the first injection signal and records the RSSI level of the first injection signal in impedance measurement controller 251.

In the second step of the measurement process, impedance measurement controller. 251 causes terminating switch 360 to close toward the left side of terminating switch 360 (as shown in FIG. 3) to cause a second injection signal to be transferred to the second input terminal of circulator 370. The second injection signal is identical to the first injection signal and has the same frequency and amplitude as the first injection signal. Circulator 370 transfers the second injection signal to duplexer 310. The second injection signal travels through duplexer 310 and hits antenna array 255. Energy that is not absorbed by antenna array 255 reflects back through duplexer 310, around circulator 370 and down circuit branch 300 in the direction of the receiver forward path through low noise amplifier 330. The reflected second injection signal is treated as a normal input signal which goes through receive path circuitry 335 to an automatic gain control (AGC) circuit (not shown). The AGC circuit controls the gain of the second injection signal in accordance with well known AGC principles. Level detector circuitry 340 then determines the RSSI level of the second injection signal and records the RSSI level of the second injection signal in impedance measurement controller 251.

A software algorithm in impedance measurement controller 251 compares the two recorded RSSI levels and determines a voltage standing wave ratio (VSWR) measurement. Impedance measurement controller 251 then stores the result as the return loss measurement for antenna array 255.

The injection circuit of the present invention will work even if there is no duplexer 310 in circuit branch 300. That is, the injection circuit that comprises circulator 370 will work in an RF receiver that does not include a duplexer. Duplexer 310 is used in RF transceiver units that are capable of both transmitting and receiving RF signals. In an RF receiver without an RF transmitter duplexer 310 will not be present.

The use of circulator 370 in the advantageous embodiment of the present invention facilitates the control of the directivity of the injected signals. Specifically, circulator 370 is capable of providing at least approximately 20 dB of reverse isolation between its input signal and its output signal. As a result, circulator 370 may transfer a signal that is at least approximately 20 dB below its output signal back through duplexer 310 to antenna array 255. The level of reverse isolation provided by circulator 370 exceeds the level of reverse isolation provided by a directional coupler such as directional coupler 320.

The inclusion of circulator 370 in circuit branch 300 improves the accuracy in the measurements of signals from antenna array 255 by increasing the level of isolation between duplexer 310 (or antenna array 255) and low noise amplifier 330 with respect to the level of isolation available in prior art designs. The relatively high level of reverse isolation provided by circulator 370 (compared to the level of reverse isolation provided by directional couplers) means that in the present invention it is less likely that a portion of the signal energy at the output of circulator 370 will be transferred back through duplexer 310 to antenna array 255 and reflected back through duplexer 310 to circulator 370 and into the receiver forward path direction. Any additional energy that is reflected back into the receiver forward path direction adversely affects the RSSI measurements and causes an erroneous determination of the voltage standing wave ratio (VSWR). In the present invention, the use of circulator 370 in conjunction with directional coupler 320 reduces the levels of the additional reflected energy and significantly improves the accuracy of the RF signal measurements.

Impedance measurement controller 251 initiates an RSSI calibration by enabling injection source 350 and injecting an injection signal through terminating switch 360 to directional coupler 320. Directional coupler 320 combines the injection signal from terminating switch 360 with an RF receive signal from circulator 370, if any, and transfers the resulting signal to low noise amplifier 330. The resulting signal is treated as a normal input signal which goes through receive path circuitry 335 to an automatic gain control (AGC) circuit (not shown). The AGC circuit controls the gain of the resulting signal in accordance with well known AGC principles. Level detector circuitry 340 then determines the RSSI level of the resulting signal and records the RSSI level of the resulting signal in impedance measurement controller 251.

Impedance measurement controller 251 uses the RSSI measurement to offset, an existing RSSI curve that is stored in impedance measurement controller 251. The amount of offset represents the variation in RF receiver gain caused by component performance variations due to temperature and frequency. Impedance measurement controller 251 stores the offset and the RSSI measurement for use in calibrating the RF receiver gain.

During the RSSI calibration measurement, the presence of circulator 370 provides at least 20 dB of reverse isolation in circuit branch 300 and serves to reduce the amount of signal energy that reaches duplexer 310. Any signal energy that reaches circulator 370 from directional coupler 320 is transferred toward terminating switch 360 and is not reflected back into the receiver forward path direction.

Prior art injection circuitry without circulator 370 allows signal energy to travel toward duplexer 310. Depending upon the amount of antenna load, the signal energy reflects off the antenna load and back into the receiver forward path direction. The reflected signal energy that is allowed to occur in prior art injection circuitry adversely affects the signal measurement process and the accuracy of the measured signals.

The presence of circulator 370 in circuit branch 300 reduces the amount of signal energy that is reflected back into the receiver forward path direction. In this manner, circulator 370 increases the accuracy of the measurements of the signals over the accuracy that may be achieved by prior art methods that use injection circuitry.

The present invention provides an improved apparatus and method for injecting a test signal (i.e., an injection signal) into an RF receiver to obtain the corresponding RSSI measurement at any instantaneous temperature and operating channel. The ability to obtain such RSSI measurements eliminates the need for the characterization and compensation circuitry employed by prior art methods that do not use injection circuitry.

In order to further increase the accuracy of signal measurements, impedance measurement controller 251 may make sure that no incoming RF receive signal is present from duplexer 310 (or antenna array 255 if there is no duplexer 310) that would interfere with the measurement of the injection signal prior to the initiation of the measurement process. In an exemplary advantageous embodiment of the present invention, injection source 350 provides an 1880 MHz injection signal that falls directly in the center of the assigned forward channel frequency range (1880 MHz±660 kHz) with a power level that is high enough to be discernable above expected noise levels. The use of an injection signal in this frequency range allows BTS 101 to perform voltage standing wave ratio (VSWR) measurements and calibration while also handling normal communications traffic.

An advantageous embodiment of the injection circuitry of the present invention has been described that comprises circulator 370 and directional coupler 320. It is possible, however, to use circulator 370 without directional coupler 320. In this embodiment of the present invention an injection signal is transferred to circulator 370 and then transferred by circulator 370 to duplexer 310. The injection signal passes through duplexer 310 and hits antenna array 255. Energy that is not absorbed by antenna array 255 reflects back down circuit path 300 in the direction of the receiver forward path through low noise amplifier 330. Level detector circuitry 340 then obtains the RSSI measurement as previously described. The presence of directional coupler 320 is not required to obtain RSSI measurements for the reflected injection signal. Directional coupler 320 is used to obtain a reference for the voltage standing wave ratio (VSWR) measurement.

Figure 4:
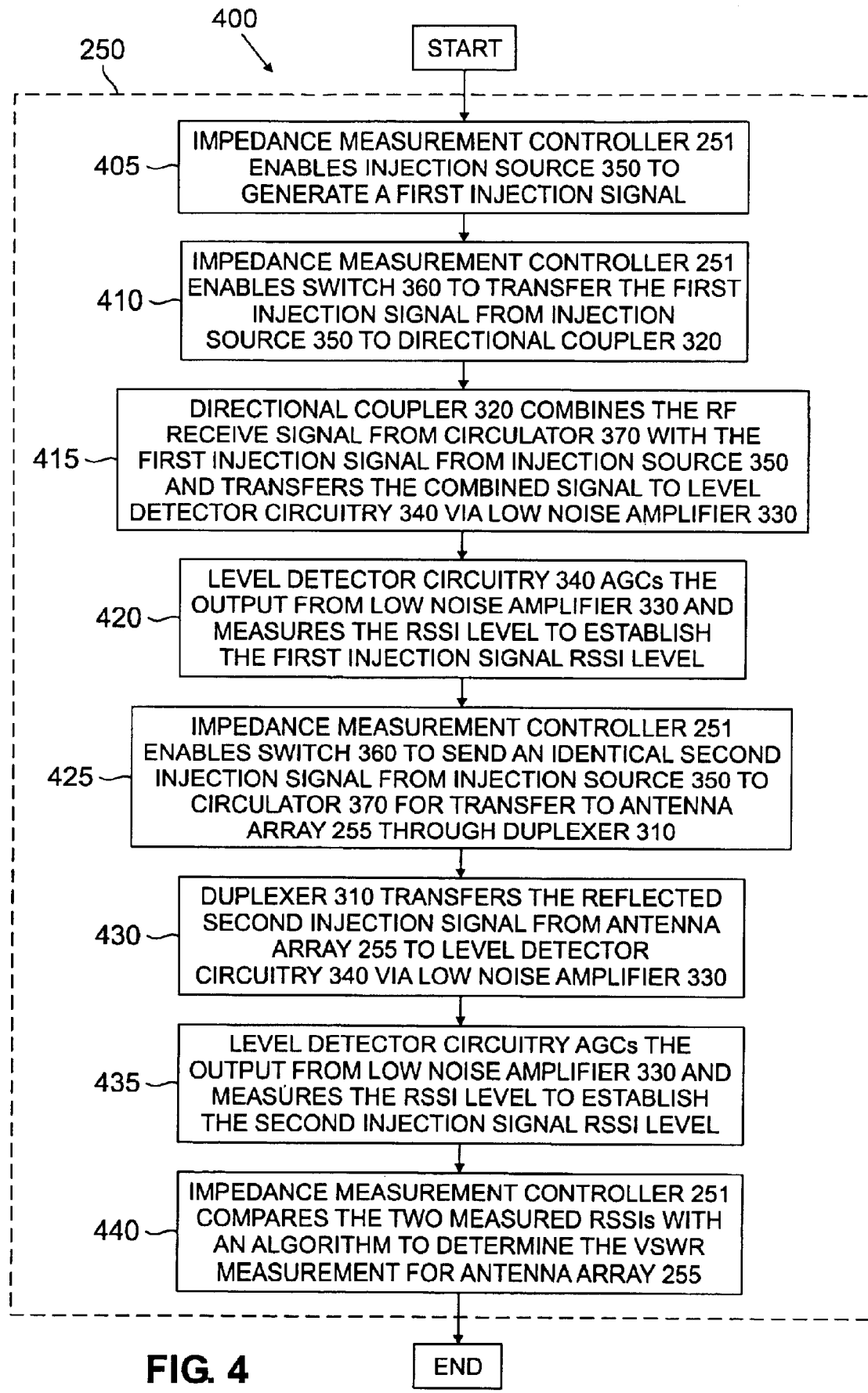
FIG. 4 illustrates a flow diagram of a method used by an advantageous embodiment of the present invention to determine voltage standing wave ratio (VSWR) measurements.

FIG. 4 illustrates an exemplary flow diagram 400 that describes the operation of the exemplary advantageous embodiment of the present invention in RF transceiver unit 250 for measuring the return loss of antenna array 255. Initially, impedance measurement controller 251 enables injection source 350 to generate a first injection signal (process step 405). The frequency of the first injection signal is preferably at the center frequency of the RF receiver operating range. Next, impedance measurement controller 251 enables terminating switch 360 to transfer the first injection signal from injection source 350 through terminating switch 360 to one input of directional coupler 320 (process step 410).

Directional coupler 320 combines the first injection signal from injection source 350 with the RF receive signal from circulator 370 and transfers the combined signal to level detector circuitry 340 via low noise amplifier 330 (process step 415). Level detector circuitry 340 in RF transceiver unit 250 receives the amplified signal from low noise amplifier 330, uses the existing AGC detector of transceiver IF 245 to automatically adjust the gain of the signal from low noise amplifier 330, and measures the resultant RSSI level for the first injection signal and records the resultant RSSI level for the first injection signal in impedance measurement controller 251 (process step 420).

Next, impedance measurement controller 251 enables terminating switch 360 to send a second injection signal from injection source 350 to the second input of circulator 370. The second injection signal has the same frequency and amplitude as the first injection signal. Circulator 370 then passes the second injection signal through duplexer 310 to antenna array 255 (process step 425). Next, duplexer 310 transfers the reflected second injection signal from antenna array 255 to level detector circuitry 340 through circulator 370, directional coupler 320, and low noise amplifier 330 (process step 530). Level detector circuitry 340 in RF transceiver unit 250 receives the amplified signal from low noise amplifier 330, uses the existing AGC detector of transceiver IF 245 to automatically adjust the gain of the signal from low noise amplifier 330, and measures the resultant RSSI level for the reflected second injection signal and records the resultant RSSI level for the reflected second injection signal in impedance measurement controller 251 (process step 435). Impedance measurement controller 251 uses a software algorithm to compare the two measured RSSI levels and determines a voltage standing wave ratio (VSWR) measurement (process step 440).

Although the present invention has been described in detail, those skilled in the art should understand that they can make various changes, substitutions and alterations herein without departing from the spirit and scope of the invention in its broadest form.

What is claimed is:

1. For use in a wireless network capable of communicating with a plurality of mobile stations in a coverage area of said wireless network, a base station comprising:

a radio frequency (RE) receiver unit comprising an RF receive path capable of being coupled to an antenna that receives an RF signal; and an injection circuit for measuring RF signals in said RF receive path comprising:

a circulator coupled to said antenna and coupled to said RF receive path;

an injection source coupled to said circulator, wherein said injection source is capable of injecting a test RF signal into said circulator; and level detector circuitry associated with said RF receive path capable of measuring a signal strength of an RF signal in said RF receive path.

2. The base station as set forth in claim 1 wherein said RF receive path further comprises an amplifier coupled to said level detector circuitry, said level detector circuitry capable of measuring a received signal strength indicator of the RF signal in said RF receive path.

3. The base station as set forth in claim 1 wherein said RF receive path further comprises an amplifier coupled to said level detector circuitry and automatic gain control circuitry coupled to said level detector circuitry, said automatic gain control circuitry capable of controlling the gain of the RF signal in said RF receive path.

4. The base station as set forth in claim 1 further comprising a duplexer coupled between said antenna and said circulator.

5. The base station as set forth in claim 1 further comprising a directional coupler coupled to said circulator and to said RF receive path.

6. The base station as set forth in claim 5 wherein said injection source is coupled to said directional coupler, and wherein said injection source is capable of injecting a test RF signal into said directional coupler.

7. The base station as set forth in claim 6 further comprising a switch coupled to said circulator and coupled to said directional coupler for selectively enabling and disabling the transfer of test RF signals from said injection source to said circulator and from said injection source to said directional coupler.

8. The base station as set forth in claim 7 further comprising an impedance measurement controller coupled to said switch, said impedance measurement controller capable of causing said switch to selectively enable and disable the transfer of test RF signals from said injection source to said circulator and from said injection source to said directional coupler.

9. The base station as set forth in claim 7 wherein said RF receive path further comprises an amplifier coupled to said level detector circuitry, said level detector circuitry capable of measuring a received signal strength indicator of the RF signal in said RF receive path.

10. The base station as set forth in claim 7 wherein said RF receive path further comprises an amplifier coupled to said level detector circuitry and automatic gain control circuitry coupled to said level detector circuitry, said automatic gain control circuitry capable of controlling the gain of the RF signal in said RF receive path.

11. A wireless network comprising a plurality of base stations capable of communicating with a plurality of mobile stations in a coverage area of said wireless network, at least one of said plurality of base stations comprising:
   a radio frequency (RF) receiver unit comprising an RF receive path capable of being coupled to an antenna that receives an RF signal; and
   an injection circuit for measuring RF signals in said RF receive path comprising:
   a circulator coupled to said antenna and coupled to said RF receive path;
   an injection source coupled to said circulator, wherein said injection source is capable of injecting a test RF signal into said circulator; and
   level detector circuitry associated with said RF receive path capable of measuring a signal strength of an RF signal in said RF receive path.

12. The wireless network as set forth in claim 11 wherein said RF receive path further comprises an amplifier coupled to said level detector circuitry, said level detector circuitry capable of measuring a received signal strength indicator of the RF signal in said RF receive path.

13. The wireless network as set forth in claim 11 wherein said RF receive path further comprises an amplifier coupled to said level detector circuitry and automatic gain control circuitry coupled to said level detector circuitry, said automatic gain control circuitry capable of controlling the gain of the RF signal in said RF receive path.

14. The wireless network as set forth in claim 11 further comprising a duplexer coupled between said antenna and said circulator.

15. The wireless network as set forth in claim 11 further comprising a directional coupler coupled to said circulator and to said RF receive path.

16. The wireless network as set forth in claim 15 wherein said injection source is coupled to said directional coupler, and wherein said injection source is capable of injecting a test RF signal into said directional coupler.

17. The wireless network as set forth in claim 16 further comprising a switch coupled to said circulator and coupled to said directional coupler for selectively enabling and disabling the transfer of test RF signals from said injection source to said circulator and from said injection source to said directional coupler.

18. The wireless network as set forth in claim 17 further comprising an impedance measurement controller coupled to said switch, said impedance measurement controller capable of causing said switch to selectively enable and disable the transfer of test RF signals from said injection source to said circulator and from said injection source to said directional coupler.

19. The wireless network as set forth in claim 17 wherein said RF receive path further comprises an amplifier coupled to said level detector circuitry, said level detector circuitry capable of measuring a received signal strength indicator of the RF signal in said RF receive path.

20. The wireless network as set forth in claim 17 wherein said RF receive path further comprises an amplifier coupled to said level detector circuitry and automatic gain control circuitry coupled to said level detector circuitry, said automatic gain control circuitry capable of controlling the gain of the RF signal in said RF receive path.

21. For use in a wireless network capable of communicating with a plurality of mobile stations in a coverage area of said wireless network, a base station comprising:
   a radio frequency (RF) receiver unit comprising an RF receive path capable of being coupled to an antenna that receives an RF signal;
   an injection circuit for measuring RF signals in said RF receive path comprising:
   a circulator coupled to said antenna and coupled to said RF receive path;
   an injection source coupled to said circulator, wherein said injection source is capable of injecting a test RF signal into said circulator; and
   level detector circuitry associated with said RF receive path capable of measuring a signal strength of an RF signal in said RF receive path;
   a directional coupler coupled to said circulator and to said RF receive path, wherein said injection source is coupled to said directional coupler, and wherein said injection source is capable of injecting a test RF signal into said directional coupler;
   a switch coupled to said circulator and coupled to said directional coupler for selectively enabling and disabling the transfer of test RF signals from said injection source to said circulator and from said injection source to said directional coupler; and
   an impedance measurement controller coupled to said switch, said impedance measurement controller capable of causing said switch to selectively enable and disable the transfer of test RF signals from said injection source to said circulator and from said injection source to said directional coupler.

22. The base station as set forth in claim 21 wherein said RF receive path further comprises an amplifier coupled to said level detector circuitry, said level detector circuitry capable of measuring a received signal strength indicator of the RF signal in said RF receive path.

23. The base station as set forth in claim 21 wherein said RF receive path further comprises an amplifier coupled to said level detector circuitry and automatic gain control circuitry coupled to said level detector circuitry, said automatic gain control circuitry capable of controlling the gain of the RF signal in said RF receive path.

24. A wireless network comprising a plurality of base stations capable of communicating with a plurality of mobile stations in a coverage area of said wireless network, at least one of said plurality of base stations comprising:
   a radio frequency (RF) receiver unit comprising an RF receive path capable of being coupled to an antenna that receives an RF signal;
   an injection circuit for measuring RF signals in said RF receive path comprising:
   a circulator coupled to said antenna and coupled to said RF receive path;
   an injection source coupled to said circulator, wherein said injection source is capable of injecting a test RF signal into said circulator; and level detector circuitry associated with said RF receive path capable of measuring a signal strength of an RF signal in said RF receive path;

a directional coupler coupled to said circulator and to said RF receive path, wherein said injection source is coupled to said directional coupler, and wherein said injection source is capable of injecting a test RF signal into said directional coupler;

a switch coupled to said circulator and coupled to said directional coupler for selectively enabling and disabling the transfer of test RF signals from said injection source to said circulator and from said injection source to said directional coupler; and an impedance measurement controller coupled to said switch, said impedance measurement controller capable of causing said switch to selectively enable and disable the transfer of test RF signals from said injection source to said circulator and from said injection source to said directional coupler.

25. The wireless network as set forth in claim 24 wherein said RF receive path further comprises an amplifier coupled to said level detector circuitry, said level detector circuitry capable of measuring a received signal strength indicator of the RF signal in said RF receive path.

26. The wireless network as set forth in claim 24 wherein said RF receive path further comprises an amplifier coupled to said level detector circuitry and automatic gain control circuitry coupled to said level detector circuitry, said automatic gain control circuitry capable of controlling the gain of the RF signal in said RF receive path.

* * * * *

UNITED STATES PATENT AND TRADEMARK OFFICE
CERTIFICATE OF CORRECTION

PATENT NO. : 6,956,896 B2 Page 1 of 1
APPLICATION NO. : 10/761833
DATED : October 18, 2005
INVENTOR(S) : Mitchell K. Johnson It is certified that error appears in the above-identified patent and that said Letters Patent is hereby corrected as shown below:

Column 6, line 65, delete "ES" and replace with --BS--;

Column 9, line 16, delete "." after the term "controller";

Column 12, line 7, delete "." after the term "resultant";

Column 12, claim 1, line 23, delete "(RE)" and replace with --(RF)--.

Signed and Sealed this

First Day of August, 2006

JON W. DUDAS
*Director of the United States Patent and Trademark Office*